United States Patent [19]

Tsuji

[11] Patent Number: 5,049,989
[45] Date of Patent: Sep. 17, 1991

[54] METHOD AND CIRCUIT FOR REDUCING THE INFLUENCE OF A BRIGHT IMAGE AREA IN AN ENDOSCOPE IMAGE SIGNAL

[75] Inventor: Kiyoshi Tsuji, Musashino, Japan

[73] Assignee: Olympus Optical Co., Ltd., Tokyo, Japan

[21] Appl. No.: 460,784

[22] Filed: Jan. 4, 1990

[51] Int. Cl.⁵ .................... A61B 1/04; H04N 5/235
[52] U.S. Cl. ..................................... 358/98; 358/168
[58] Field of Search ............... 358/98, 168, 167, 211, 358/96, 160, 213.18, 213.19, 36, 161; 128/6, 4

[56] References Cited

U.S. PATENT DOCUMENTS

| 4,667,225 | 5/1987 | Kanda . | |
|---|---|---|---|
| 4,799,106 | 1/1989 | Moore et al. | 358/168 |
| 4,834,070 | 5/1989 | Saitou | 358/98 X |

FOREIGN PATENT DOCUMENTS

| 51-114823 | 10/1976 | Japan . |
|---|---|---|
| 56-107674 | 8/1981 | Japan . |
| 57-17291 | 1/1982 | Japan . |
| 61-34793 | 10/1986 | Japan . |
| 62-110369 | 5/1987 | Japan . |
| 62-272768 | 11/1987 | Japan . |
| 1-200783 | 8/1989 | Japan . |
| 1-218194 | 8/1989 | Japan . |

Primary Examiner—Victor R. Kostak
Attorney, Agent, or Firm—Armstrong, Nikaido, Marmelstein, Kubovcik & Murray

[57] ABSTRACT

A method and circuit reduces the influence of a bright image area in an endoscope image signal. From the endoscope image signal, a signal component of the bright image area of a level difference from the periphery above a predetermined value and a spatial size below a predetermined value are extracted. The part, corresponding to the bright image area in the image signal or a signal based on the image signal, is depressed using the signal component of the bright image area.

33 Claims, 16 Drawing Sheets

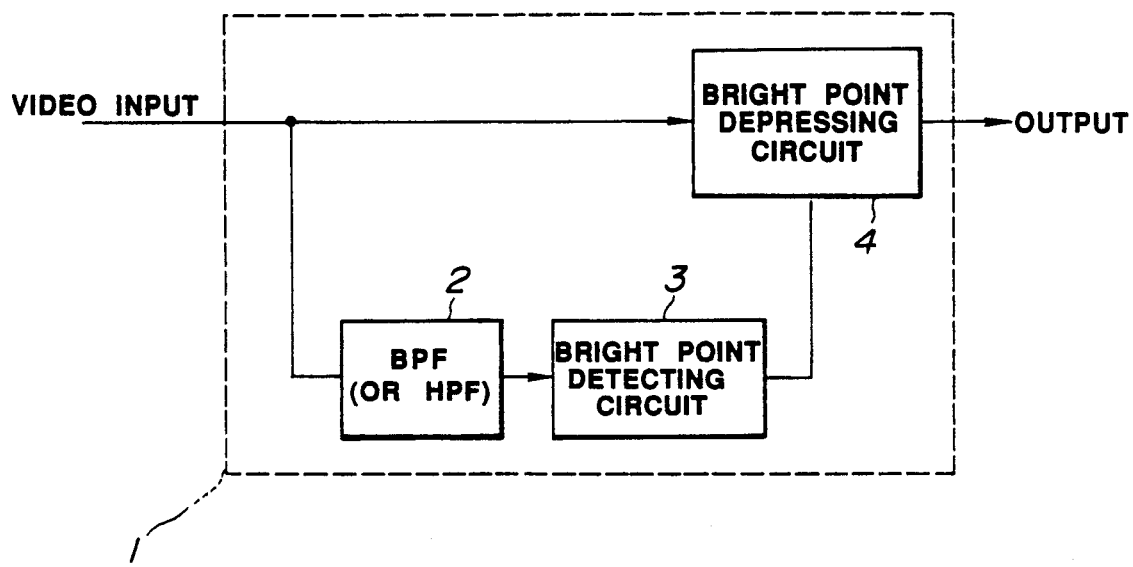
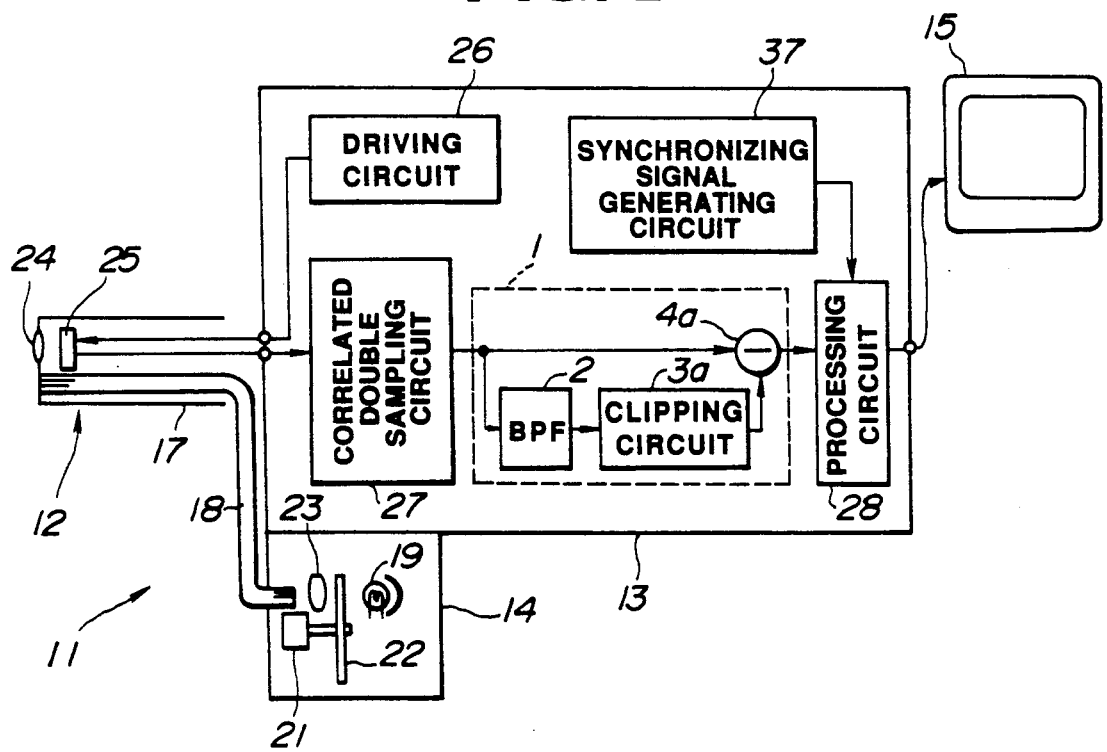

FIG. 3
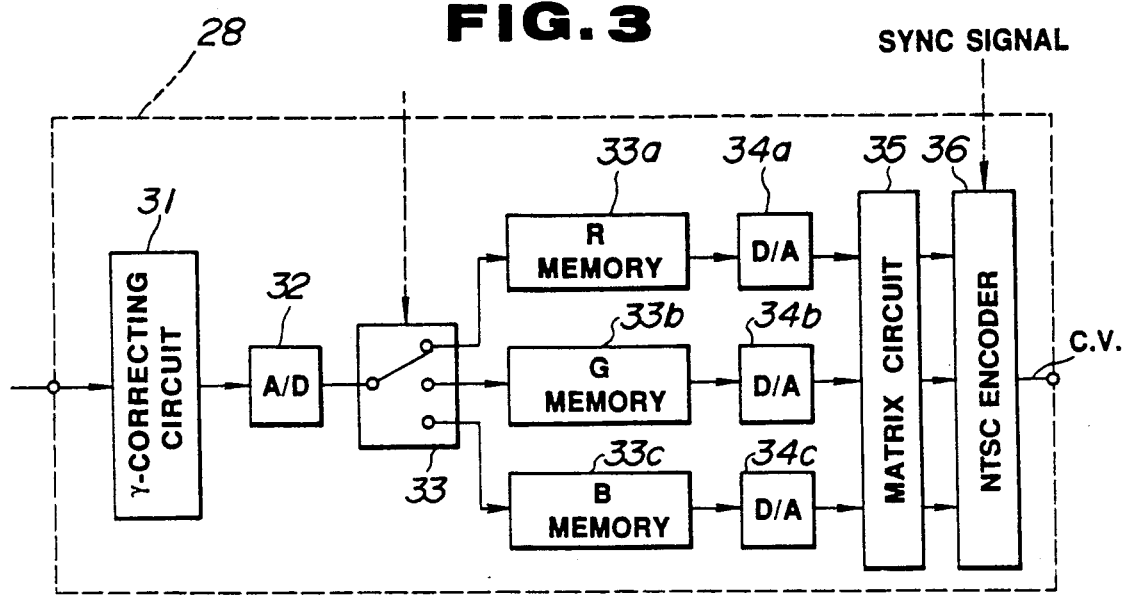
FIG.4(a)
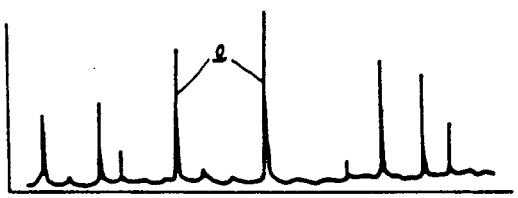
FIG.4(b)
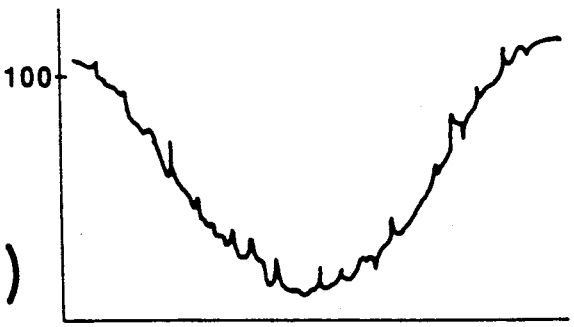
FIG.4(c)

RELATED ART
FIG.25(a)
FIG.25(b)
FIG.25(c)
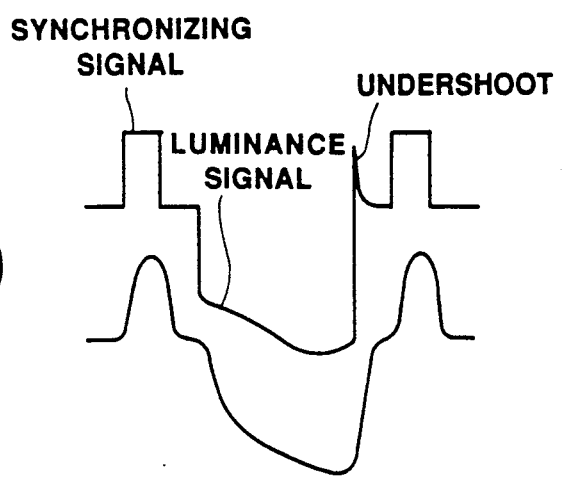
FIG.26 RELATED ART
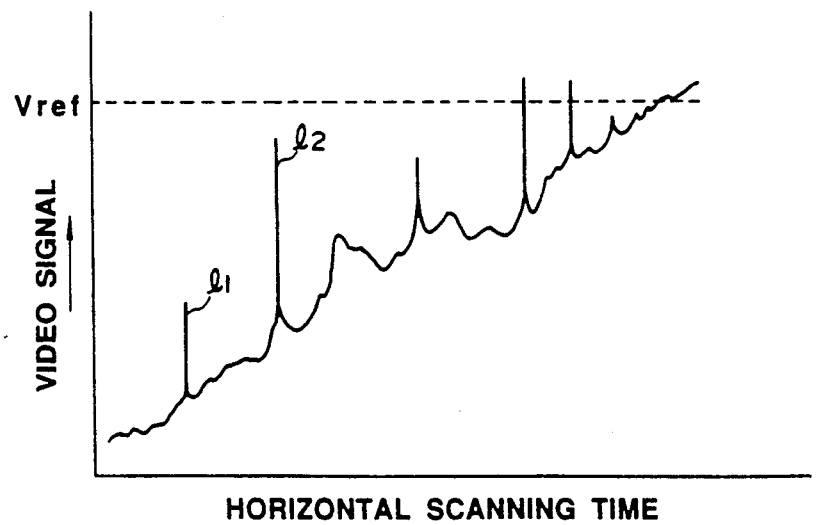

METHOD AND CIRCUIT FOR REDUCING THE INFLUENCE OF A BRIGHT IMAGE AREA IN AN ENDOSCOPE IMAGE SIGNAL

BACKGROUND OF THE INVENTION

1. Field of the Invention

This invention relates to a method and circuit for reducing the influence of a bright image area in an endoscope image signal.

2. Related Art Statement

Recently, solid state imaging devices such as CCD's have come to be used as imaging means of various apparatuses.

However, the dynamic range of the so far existing imaging means is so narrow that it is difficult to produce a video signal which reflects the contrast of the natural field well.

For example, if the brightness of an object to be imaged is different from a proper exposure level of an imaging means, this part will become too dark an image or, the contrary, too bright on a displayed picture.

Recently, endoscopes are extensively utilized for medical and industrial uses. An endoscope provided with an imaging means has been developed. Such an endoscope usually has an illuminating means. Therefore, in a medical endoscope, when observing, for example, a mucous membrane of a living body, by the reflection of an illuminating light on the mucous membrane, a local bright part or bright image area, that is, a bright point will be produced. Also, in an industrial endoscope, when observing, for example, a metal surface, by the reflection of an illuminating light on the metal surface, a bright point or bright image area will be produced.

For example, FIG. 24(a) shows an example of a video signal in one horizontal period when a tubular object interior is imaged. If a lustrous object, such as a living body mucous membrane or metal surface, is present as an object to be imaged within a tube, a part (bright point) having a large reflected light amount will be locally generated. If such an object is imaged by an imaging device, the signal level of the above mentioned bright point will become so high that bright point signals 1, 1, ... as are shown in FIG. 24(a) will be generated. Unless the luminance level of another view point is reduced until the observation is impossible, the luminance output of that bright point will become so large as to mostly saturate the imaging device.

The projecting bright point signals 1, 1, ... will be integrated by a low pass filter (LPF) device of a video signal processing circuit and the widths (occupied areas) of the bright point signals 1, 1, ... will apparently increase or will deteriorate a beam on a CRT and will cause the same phenomenon to occur.

Particularly, the bright point projecting out of a dark part is so large in the luminance difference from the periphery as to obstruct the observation and can be said to be an unnecessary high luminance part.

Therefore, the publication, for example, of Japanese Patent Application Laid Open No. 107674/1981 discloses a technique wherein a γ-correcting amount of a which processes circuit processing signals can be switched so that a part which is very different in luminance may be observed even if it is present within a displayed picture.

However, in this technique, on the video signal shown in FIG. 24(a), the γ characteristic on the entire picture is changed and the high luminance part is compressed to make video signal as is shown in FIG. 24(b). In such a case, the high luminance parts other than the bright point signals 1, 1, ... will also be compressed, therefore necessary information will also be compressed and, as a result, the dynamic range of the necessary information part will be reduced. The γ characteristic of the necessary information part will vary and therefore the fidelity of the reproduced image will deteriorate. As understood from FIG. 24(b), as the bright point signals (i.e., bright image area) 1', 1', ... projecting out of the central part (dark part) of the picture are still displayed at a high luminance, the observation of the part desired to be observed will be obstructed.

The publication of Japanese Patent Application Laid Open No. 272768/1987 discloses a distortion removing circuit wherein a video signal is input into an LPF and is compared with an original signal not transmitted through the LPF and the undershoot or the like of the original signal is clipped with the difference signal.

This prior art example is to prevent the unnecessary undershoot in the video signal from causing a misoperation at the time of a synchronizing separation or the like. In this prior art example, an original signal including the undershoot shown in FIG. 25(a) is passed through a low pass filter to obtain a video signal as is shown in FIG. 25(b) and, in case the difference between this video signal and the original signal shown in FIG. 25(a) is above a predetermined level, the original signal will be clipped with a level limiter to obtain the signal shown in FIG. 25(c).

This prior art example is to prevent the undershoot in the video signal from being misconceived as a synchronizing signal which is a signal projecting on the black level side in the video image. Therefore, the above mentioned prior art example is to remove a distortion projecting on the black level side. On the other hand, a bright point projects on the white level side and can not be removed in the above mentioned prior art example.

In case the imaging device is a solid state imaging device of a single plate color imaging system using a color mosaic filter or the like, by the difference in the transmissivity of the respective color filters for color separation, the saturated light amounts of the corresponding imaging pixels will be different and therefore a psuedo-color will be generated at the time of a high luminance incidence.

A pseudo-color will be generated also in the part having no pixel correlation with the components (for example, red (R), green (G), blue (B), magenta (Mg), G, cyanine (Cy) and yellow (Ye)) of a color filter separating a white color, for example, in the edge part of the video image. In such a case, the tone of the generated pseudo-color will be different depending on what color filter part among the components lacks the incidence upon the edge part.

Therefore, as prior art examples improving the above mentioned defect, there are Japanese Patent Applications Laid Open Nos. 114823/1976 and 17291/1982 and Japanese Utility Model Application Laid Open No. 34793/1986. The first and second prior art examples are to detect a high luminance part and depress a color signal on that part. The third prior art example is to somewhat widen a detected high luminance part so that the lag of the pseudo-color generating range by the lag element of the video circuit system and the edge part pseudo-color may have a depressing width margin.

The disadvantages of the above mentioned prior art examples shall be explained in the following with reference to FIG. 26.

FIG. 26 shows an example of a video signal in one horizontal scanning period. This video signal is a waveform in which spike-like bright point parts are overlapped in a low range component in which the luminance level varies as inclined.

For the above mentioned reasons, a pseudo-color (high luminance coloring) will be generated in the high luminance part, for example, a part that exceeds Vref in FIG. 26 and also in the part in which the luminance variation is violent, that is, in the spike-like bright point parts.

On the other hand, the first to third prior art examples are to merely detect a high luminance part and depress the chroma saturation and therefore can reduce the pseudo-color of the above mentioned former but have no function of reducing the latter, that is, the bright points (shown by $l_i$, $l_2$, ... in FIG. 26) having levels below Vref.

OBJECT AND SUMMARY OF THE INVENTION

An object of the present invention is to provide a method and circuit wherein the influence of a bright part (i.e., bright image area) in an endoscope image signal can be effectively reduced so as not to obstruct the endoscope observation.

In the method and circuit whereby the influence of a bright image area in an endoscope image signal can be effectively reduced so as not to obstruct the endoscope observation, a signal component of a bright image area in which the level difference from the periphery is above a predetermined value and the spatial size is below a predetermined value, is extracted from an endoscope image signal. The part corresponding to the above mentioned bright image area in the above mentioned image signal or a signal based on the above mentioned image signal, is depressed by using the signal component of the above mentioned bright image area.

The other features and advantages of the present invention will become apparent with the following explanation.

BRIEF DESCRIPTION OF THE DRAWINGS

FIGS. 1 to 4 relate to the first embodiment of the present invention.

FIG. 1 is a block diagram showing the summary of this embodiment.

FIG. 2 is a block diagram showing the formation of an endoscope apparatus.

FIG. 3 is a block diagram showing a processing circuit.

FIGS. 4(a) to (c) are waveform diagrams for explaining the operation of this embodiment.

FIG. 5 is a block diagram showing the summary of this embodiment.

FIG. 6 is a circuit diagram showing a band pass filter.

FIG. 7 is a characteristic diagram showing the characteristics of a band pass filter.

FIG. 8 is a block diagram showing the summary of this embodiment.

FIG. 9 is a circuit diagram showing a bright point detecting circuit.

FIG. 10 is a block diagram showing the formation of an endoscope apparatus.

FIG. 11 is a block diagram showing a bright point reducing circuit.

FIG. 12 is a block diagram showing the formation of an endoscope apparatus.

FIG. 13 is a block diagram showing an essential part of a modification of this embodiment.

FIGS. 14 and 15 relate to the sixth embodiment of the present invention.

FIG. 14 is a block diagram showing an essential part of this embodiment.

FIGS. 16 to 19 relate to the seventh embodiment of the present invention.

FIG. 16 is a block diagram showing the summary of this embodiment.

FIG. 17 is a block diagram showing the formation of an endoscope apparatus.

FIG. 18 is a block diagram showing a pseudo-color reducing circuit.

FIGS. 24 to 26 relate to a related art.

FIGS. 25(a) to (c) are waveform diagrams for explaining the operation of a distortion removing circuit in. The related art example.

FIG. 26 is a waveform diagram showing an example of a video signal including bright points.

DETAILED DESCRIPTION OF THE PREFERRED EMBODIMENTS

Figure 5:
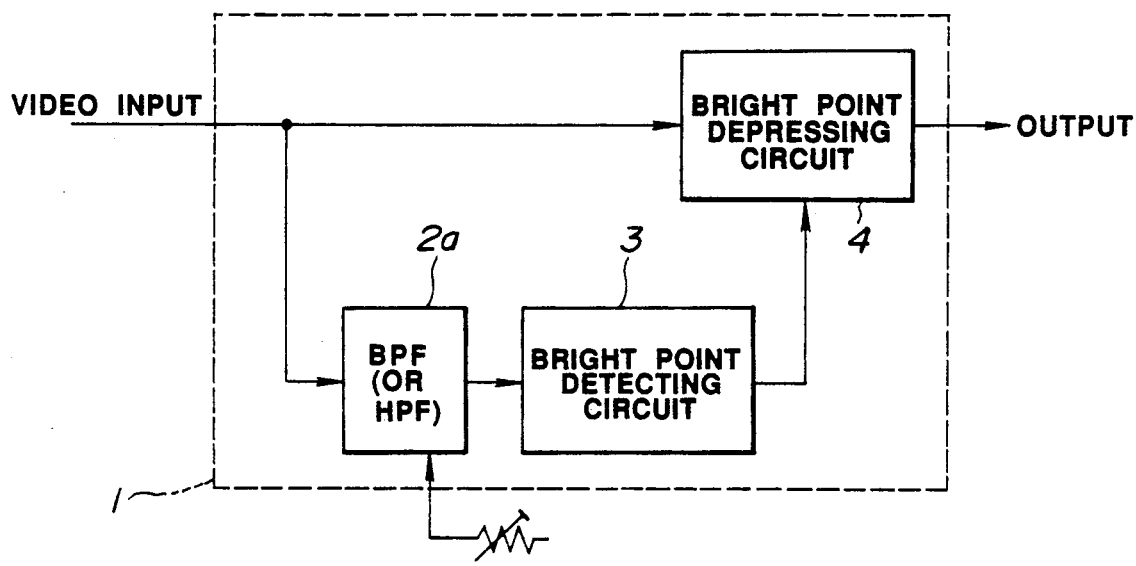
FIGS. 5 to 7 relate to the second embodiment of the present invention.

In FIGS. 1 to 4 is shown the first embodiment of the present invention.

First of all, the summary of this embodiment shall be explained with reference to FIG. 1.

In a bright point reducing circuit 1 in this embodiment, a video signal is input into a band pass filter (BPF) or high pass filter (HPF) 2, the output of this filter 2 is input into a bright point detecting circuit 3 to extract a bright point signal component. The bright point signal component in the video signal is passed through a bright point depressing circuit 4. The input video signal is reduced by using the output of this bright point detecting circuit 3. In the above mentioned video signal, when a predetermined frequency band component is extracted by the filter 2, a signal component including a bright point signal component will be extracted. When a component of a level above a predetermined value is extracted from the output of this filter 2 such as by clipping a low noise component in the bright point detecting circuit 3, the bright point signal component will be extracted. When this bright point signal component is subtracted or the like from the original video signal in the brightness depressing circuit 4, a video signal which is reduced by the bright point signal will be obtained. The extracting frequency band in the above mentioned filter 2 is set in response to the spatial size of the above mentioned bright point in order to extract only the bright point (bright part) of a spatial size below a predetermined value. The level for the above mentioned bright point detecting circuit 3 to be extracted is set to extract only the bright point of a level difference from the periphery above a predetermined value. When the component of a level above a predetermined value is extracted in this bright point detecting circuit 3, not distortion projecting on the black level side such as an undershoot but only the bright point projecting on the white level side will be detected.

This embodiment shall be explained in the following with reference to FIGS. 2 to 4.

As shown in FIG. 2, an endoscope apparatus 11 provided with the first embodiment comprises an electronic endoscope (which shall be mentioned as a video scope hereinafter) 12, a signal processing apparatus (which shall be mentioned as a CCU hereinafter) 13 for processing signals for this video scope 12, a light source unit 14 feeding an illuminating light to the above mentioned video scope 12 and a color monitor 15 displaying a video signal output from the CCU 13.

The above mentioned video scope 12 has an insertable part 17 elongated so as to be insertable into a body cavity or the like and a light guide 18 transmitting an illuminating light is inserted through this insertable part 17 and further through a universal cord extended out of an operating part and is connectable to the light source unit 14 within which a light source lamp 19 is housed. A white color light output by this light source unit lamp 19 is passed through a rotary color filter 22 which is rotated and driven by a motor 21. The light is then condensed by a condenser lens 23 and is radiated to the light guide 18 on the entrance end surface.

The above mentioned rotary filter 22 is formed of a disc-like filter frame rotated by a motor 21 and provided with three sector apertures fitted respectively with red, green and blue color transmitting filters. Therefore, by being passed through this rotary color filter 22, the white color light is sequentially made red, green and blue color light (which shall be also mentioned as frame sequential light) which is radiated to the light guide 18 on the entrance end surface.

The red, green and blue frame sequential light input to the above mentioned light guide on the entrance end surface are transmitted to the exit end surface of the light guide 18 and are radiated toward an object to be imaged. The object illuminated by the frame sequential light is made to form an image on the imaging surface of a CCD 25 as an imaging device arranged on the focal plane by an objective lens 24 fitted to the insertable part 17 at the tip. This CCD converts the optical image to an electric signal and accumulates it as a charge. The video signal read out of the CCD 25 by the application of a driving signal from a driving circuit 26 within the CCD 13 is input into a correlated double sampling circuit (which shall be mentioned as a CDS circuit hereinafter) 27.

The video signal has a reset noise or the like removed in the above mentioned CCD circuit 27 and is input into the bright point reducing circuit 1 of the first embodiment. The formation of this bright point reducing circuit 1 is that, in FIG. 1, a clipping circuit 3a is used for the bright point detecting circuit 3 and a subtractor 4a is used for the bright point depressing circuit. The video signal has the bright point signal removed in this bright point reducing circuit 1 and is input to a processing circuit 28 in the next step. This processing circuit 28 is formed as shown, for example, in FIG. 3.

The input signal is $\gamma$-corrected in a $\gamma$-correcting circuit 31, is then converted into a digital signal by an A/D converter 32 and is stored sequentially by one frame in respective R, G and B (frame) memories 33a, 33b and 33c through a multiplexer 33. The above mentioned multiplexer 33 is switched as synchronized with the rotation of the rotary filter 22.

Once the video signal data are stored by one frame in the respective memories 33a, 33b and 33c, they are simultaneously read out, are respectively made analogue R, G and B color signals through D/A converters 34a, 34b and 34c and are input into a matrix circuit 35. The video signal data is converted to a luminance signal Y and color difference signals R-Y and B-Y by this matrix circuit 35 and is then input into an NTSC encoder 36. Horizontal and vertical synchronizing signals from a synchronizing signal generating circuit 37 are input into this NTSC encoder 36, the video signal is made into a composite color video signal (VBS signal) C.V. with the synchronizing signals superimposed and is input into a color monitor 15 and the object image is color-displayed on this color monitor 15.

In the endoscope apparatus 11 provided with the above mentioned first embodiment, it is a feature that the bright point reducing circuit 1 is provided before the synchronizing signals are superimposed.

The operation of the above mentioned first embodiment shall be explained in the following.

The video signal read out of the CCD 25 by applying a driving signal from the driving circuit 26 to the CCD 25 has a reset noise or the like removed in the CDS circuit 27 and is input into the bright point reducing circuit 1 of the first embodiment. In a medical endoscope, for example, in the case of observing a living body mucous membrane, a local bright part or bright point will be generated by the reflection of the illuminating light on the mucous membrane. In an industrial endoscope, for example, when observing a metal surface, a bright point will be generated by the reflection of the illuminating light on the metal surface. If the output signal of the above mentioned CDS circuit 27 includes bright signals l, l, . . . as shown, for example, in FIG. 4(a), signals in the frequency band of the bright point signals l, l, . . . will be extracted by the BPF circuit and will be input into the clipping circuit 3a in the next step. By this clipping circuit 3a, the levels below a predetermined level are removed and only the components considered as the bright point signal l, l, . . . components shown in FIG. 4(b) are extracted. The output components of this clipping circuit 3a are input into the subtractor 4a and are subtracted from the original signal and, as shown in FIG. 4(c), a video signal including substantially no bright point signals l, l, . . . is output. This video signal is made a predetermined video signal, for example, a composite color video signal of an NTSC system through the processing circuit 28 and is color-displayed on the color-monitor 15.

In the thus operating first embodiment, the bright point signals l, l, . . . which have a large amplitude are extracted from the video signal including no synchronizing signal and are subtracted from the original signal in the subtractor 4a to produce a video signal including no bright point signals l, l, . . . .

Therefore, without being influenced by a signal component including high signal components in a synchronizing signal or by a signal component with a large amplitude, a frequency band for setting a bright point detecting level or extracting a bright point can be freely set. The γ characteristics need not be varied depending on the bright point. Therefore, the video image can be reproduced without varying the contrast and tone of the actual object (part to be inspected).

Figure 6:
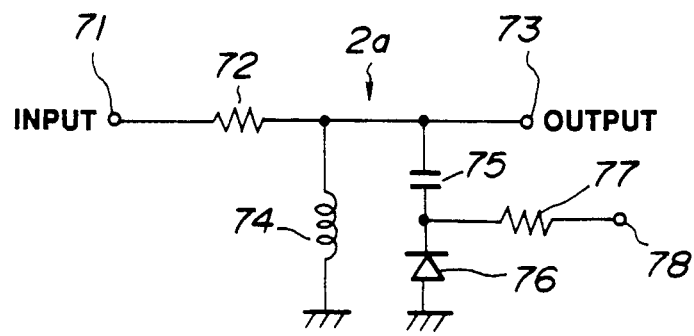
Figure 7:
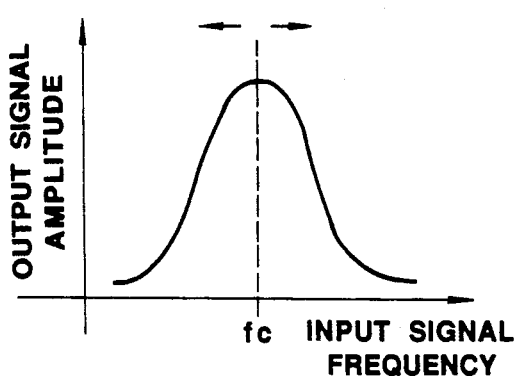

In FIGS. 5 to 7 is shown the second embodiment of the present invention.

In this embodiment, as shown in FIG. 5, a BPF (or HPF) variable in the passed frequency band is used for the BPF (or HPF) 2 in the first embodiment.

An example of the above mentioned BPF 2 is shown in FIG. 6. A resistance 72 is connected at one end to this BPF at the input end 71 and is connected at the other end to the BPF at the output end, to a coil 74 at one end and to a condenser 75 at one end. The above mentioned coil 74 is grounded at the other end. To the above mentioned condenser 75 at the other end are connected a variable capacity diode 76 at the cathode and a resistance 77 at one end. The above mentioned variable capacity diode 76 is grounded at the anode and the above mentioned resistance 77 is connected at the other end to a control terminal 78. Thus, the BPF 2a is a BPF by an LC resonance so that a resonance frequency fc may be varied by containing the variable capacity diode 76 in a capacity C. That is to say, as shown in FIG. 7, in response to the direct current voltage given to the control terminal 78, the resonance frequency fc in the characteristic curve of the BPF 2a becomes variable and the passed frequency band becomes variable.

As the passed frequency band of the BPF 2a corresponds to the spatial size of the bright point, according to this embodiment, the width of the bright point to be reduced can be controlled.

The other formations, operations and effects are the same as in the first embodiment.

Figure 8:
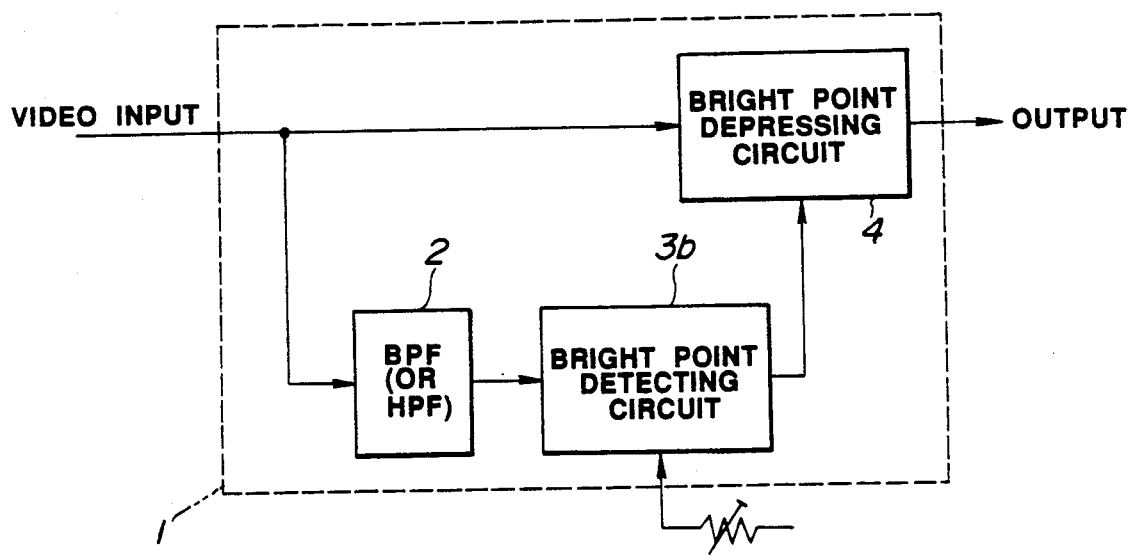
FIGS. 8 and 9 relate to the third embodiment of he pesent invention.
Figure 9:
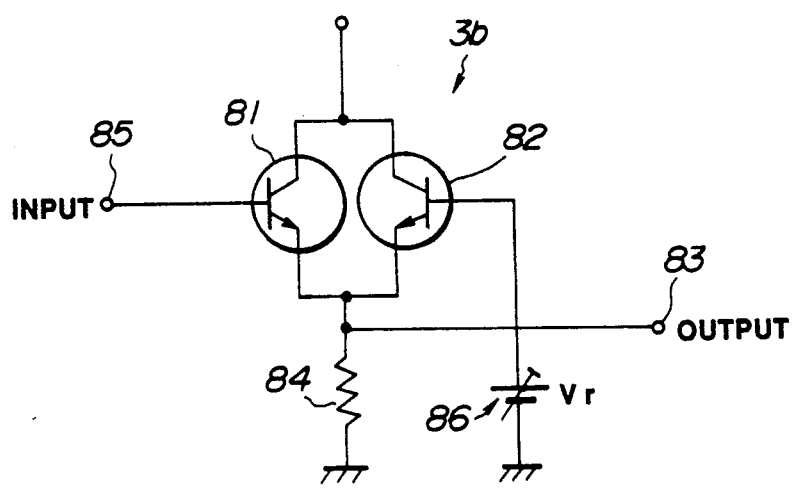

In FIGS. 8 and 9 is shown the third embodiment of the present invention.

In this embodiment, as shown in FIG. 8, a bright point detecting circuit 3b, in which a variable level, set to extract a component above a predetermined value is used for the bright point detecting circuit 3 in the first embodiment.

An example of the above mentioned bright point detecting circuit 3b is shown in FIG. 9. This circuit 3b has transistors 81 and 82 to which at the collectors is applied a current source voltage and which are connected at the emitters to the output end 83 and are grounded through a resistance 84. One transistor 81 is connected at the base to an input end 85 and the other transistor 82 is connected at the base with a direct current source 86 generating a variable reference voltage Vr.

The bright point detecting circuit 3b of formation clips or bright point signal components as are extracted by the BPF (or BPF) 2, are shown in FIG. 4(b) and are below the reference voltage Vr and extracts only the bright point components of a level above the reference voltage Vr. The level of the reference voltage Vr to be a clipping level can be variably set from outside.

According to this embodiment, when extracting only the bright points of a level difference from the periphery above a predetermined value, the above mentioned predetermined value can be varied.

The other formations, operations and effects are the same as in the first embodiment.

Figure 10:
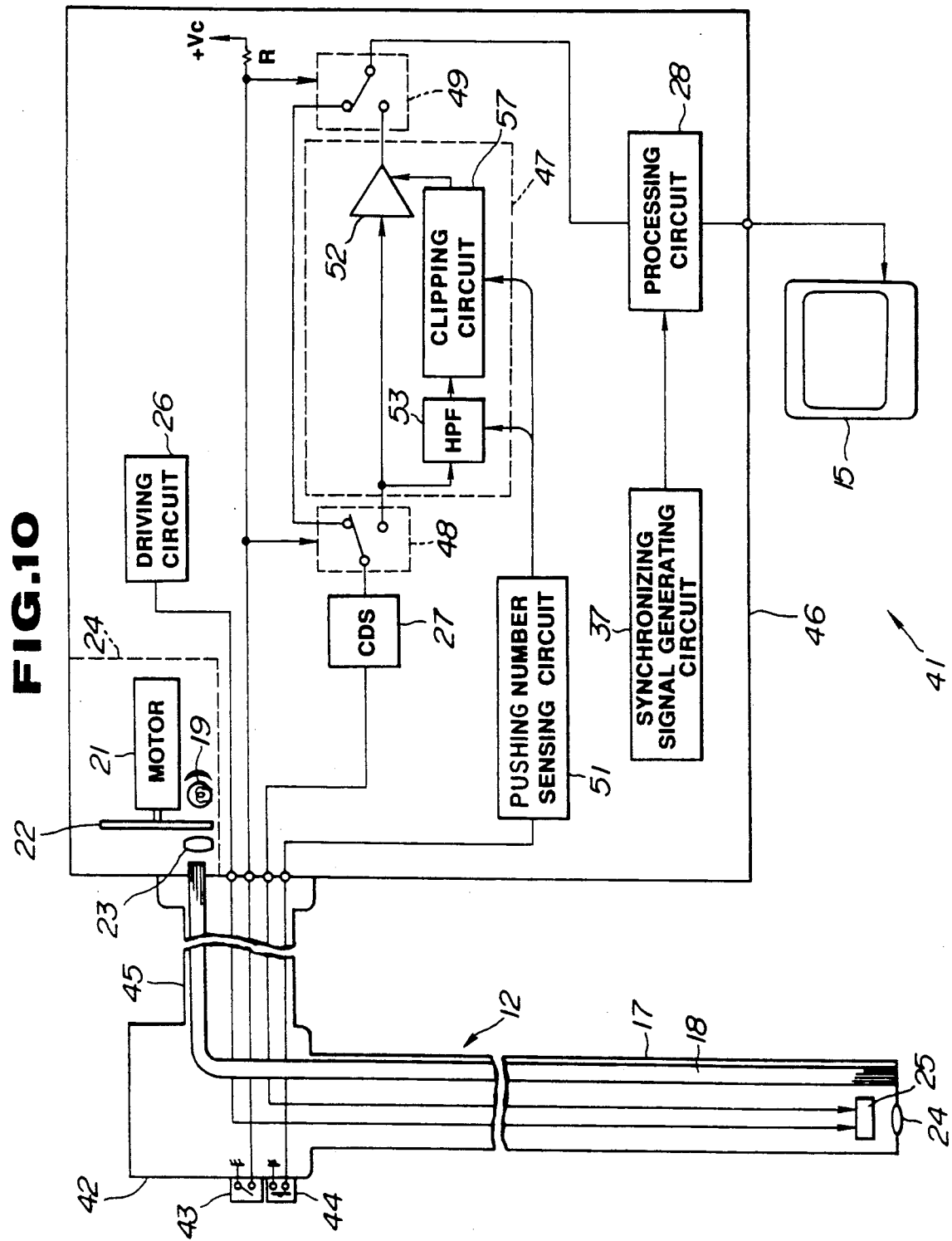
FIGS. 10 and 11 relate to the fourth embodiment of the present invention.
Figure 11:
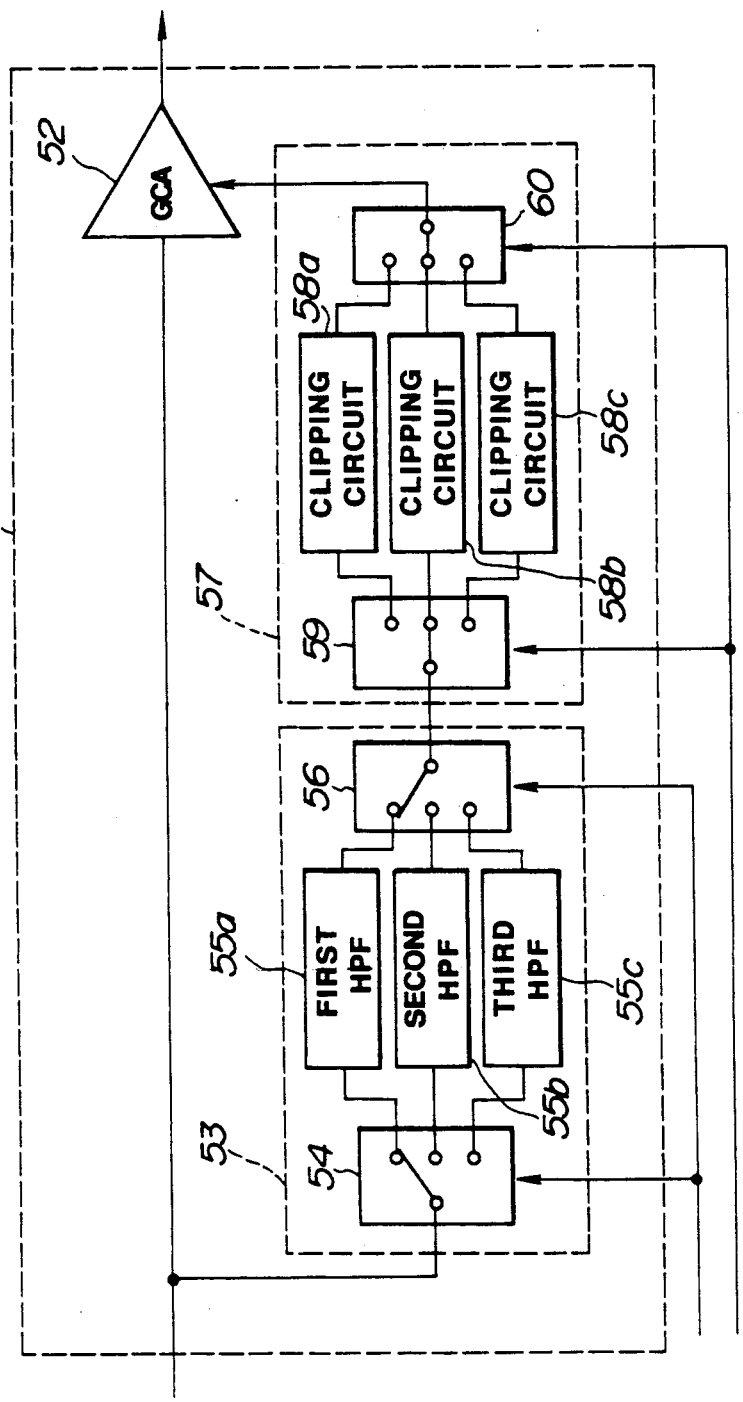

In FIGS. 10 and 11 is shown the fourth embodiment of the present invention.

As shown in FIG. 10, in an endoscope apparatus 41 in this embodiment, an operating part 42 of the video scope 12 is provided with a bright point reducing operation on/off switch 43 and a bright point reducing characteristic controlling switch 44.

Signal lines of the switches 43 and 44 provided in the operating part 42 of the above mentioned video scope 12 are inserted through a universal cord 45 so as to be connected to a CCU 46.

The signal line of the above mentioned switch 43 can control the switching of the switches 48 and 49 provided respectively at the input end and output end of a bright point reducing circuit 47. For example, these switches 48 and 49 are formed of analogue switches, have at the respective controlling ends the above mentioned signal lines connected and are connected at these controlling ends to a positive current source end Vc usually through a resistance R. In this state, as shown in FIG. 10, the output of a CDS circuit 27 is input into a processing circuit 28 without passing through the bright point reducing circuit 47. On the other hand, when the above mentioned switch 43 is switched on, an "L" level voltage will be applied to the controlling end, the switches 48 and 49 shown in FIG. 10 will be switched as operatively connected and the signal will be processed through the bright point reducing circuit 47.

The switch 44 provided in the above mentioned operating part 42 is, for example, a push-button system switch so that the bright point removing characteristics of the bright point reducing circuit 47 may be varied (selected) by the number of pushes of this switch.

For example, in the selection by the switch 44, how many times the switch has been pushed within a fixed time (for example, about several seconds) is sensed by a pushing number sensing circuit 51 and a digital signal coresponding to the sensing result is input into the bright point reducing circuit 47 through an encoder.

The above mentioned bright point reducing circuit 47 is formed as shown, for example, in FIG. 11.

The input signal is input into a gain controlling amplifier 52, is input into one of the first, second and third HPF's 55a, 55b and 55c through a switching switch 54 forming a bypass filter circuit 53 and is input into a clipping circuit 57 through a switching switch 56 operatively connected with the above mentioned switching switch 53.

The above mentioned clipping circuit 57 is also provided in the same manner with switching switches 59 and 60 respectively on the input and output sides of the first, second and third clipping circuits 58a, 58b and 58c.

In the above mentioned switching switches 54, 56; 59, 60, one of three contacts is to be selectively on by a switch controlling signal, for example, of two bits.

The above mentioned three HPF's 55a, 55b and 55c are set at different cutoff frequency values so that the observer may select one of them. The three clipping circuits 58a, 58b and 58c are set at respectively different clipping levels so that the observer may select them.

In this fourth embodiment, it can be selected to operate and not to operate the bright point reducing circuit 47 with the switch 43. Also, there is an advantage that, in the case of the operation, in response to the state of a bright point appearing on a displayed picture, the removing characteristics (for example, the frequency band and removing level) adapted to remove the bright point can be selected.

The other formations, operations and effects are the same as in the first embodiment.

Figure 12:
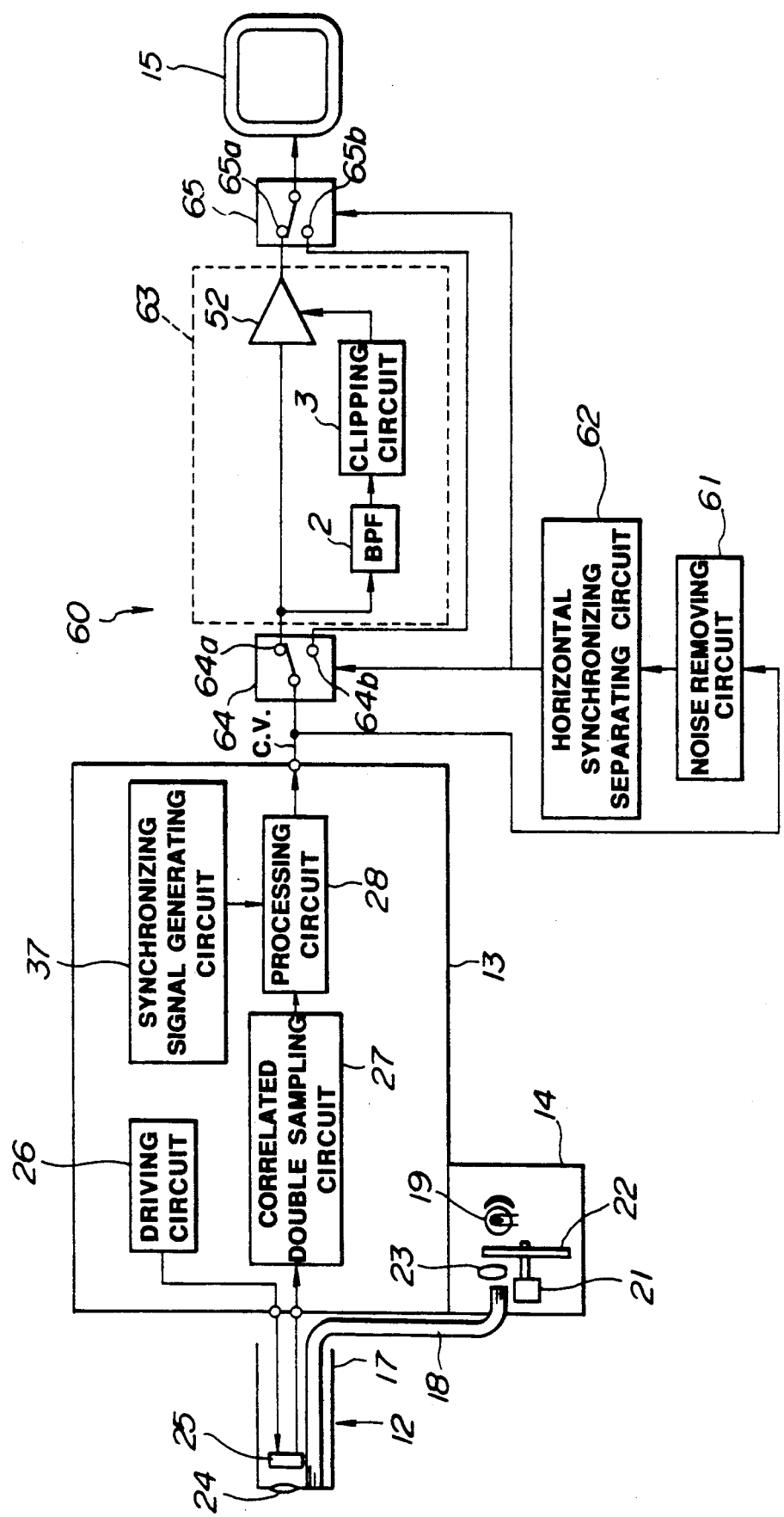
FIGS. 12 and 13 relate to the fifth embodiment of the present invention.
Figure 13:
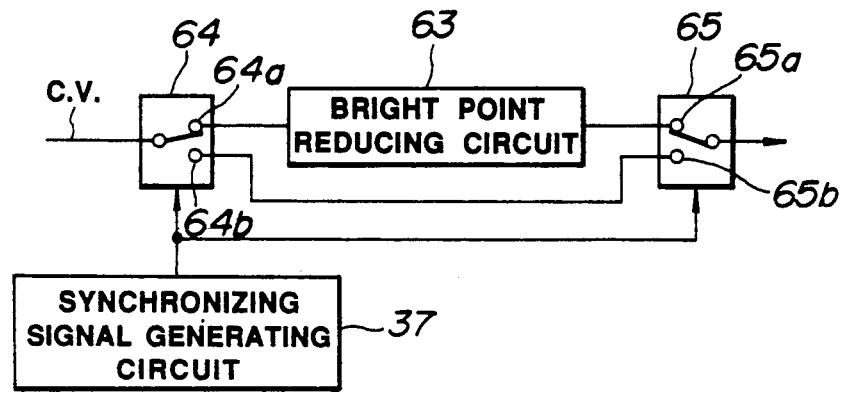

In FIGS. 12 and 13 is shown the fifth embodiment of the present invention.

In an endoscope apparatus of this embodiment, as shown in FIG. 12, a bright point reducing circuit 1 is not provided within a CCU 13, the output of a CDS circuit 27 is input into a processing circuit 28 and a composite color image signal C.V. output from this processing circuit 28 is input into a color monitor 15 through a bright point reducing apparatus 60.

In the above mentioned bright point reducing apparatus 60, the above mentioned composite color image signal C.V. is input into an analogue switch 64 of one input and two outputs at the input end and a noise removing circuit 61 (which is formed by using a circuit shown, for example, in the publication of Japanese Patent Application Laid Open No. 272768/1987). The above mentioned analogue switch 64 is connected at one output end 64a to an analogue switch 65 of two inputs and one output at one input end 65a. Also, the analogue switch 64 is connected at the other output end 64b to the analogue switch 65 at the other input end 65b. The analogue switch 65 is connected at the output end to the color monitor 15. The output of the above mentioned noise removing circuit 61 is input into a horizontal synchronizing separating circuit 62 and the above mentioned analogue switches 64 and 65 are switched by the output of this horizontal synchronizing separating circuit 62. In the above mentioned bright point reducing circuit 63, a gain controlling amplifier 52 is used instead of the subtractor 4 in the bright point reducing circuit 1 shown in FIG. 2. The bright point is reduced by varying the gain of the gain controlling amplifier 52 on the bright point part in response to the level of the bright point signal component extracted by the BPF 2 and clipping circuit 3.

In this bright point reducing circuit 60, the noise of an undershoot or the like is removed by the noise removing circuit 61 from the composite color video signal C.V., the horizontal synchronizing signal is separated and extracted by the horzontal synchronizing separating circuit 62 and the analogue switches 64 and 65 provided between the input and output ends of the bright point reducing circuit 63 are switched as operatively connected by this horizontal synchronizing signal. That is to say, when the horizontal synchronizing signal is input, both analogue switches 64 and 65 will be on on the contact 64b and 65b sides but, except when the horizontal synchronizing signal is input, they will be on on the contacts 64a and 65a sides. Therefore, the video signal except the horizontal synchronizing signal in the composite color video signal C.V. is processed to reduce the bright point by the bright point reducing circuit 63 but the horizontal synchronizing signal part is not processed by the bright point reducing circuit 63 and is output.

According to this embodiment, as the luminance of the bright point part is depressed and the amplitude of the color signal is also depressed, the chroma saturation of the bright point part will be depressed and the pseudo-color accompanying the bright point will be able to be reduced.

This embodiment can be extensively used also in a general video signal processing system.

In the modification shown in FIG. 13, in case there is a synchronizing signal generating means such as the synchronizing signal generating circuit 37, for example, within the CCU 13, the noise removing circuit 61 and horizontal synchronizing separating circuit 62 are not provided and the analogue switches 64 and 65 are controlled to be switched, not by the output of the horizontal synchronizing separating circuit 62 but, for example, by the output of the above mentioned synchronizing signal generating circuit 37.

The other formations, operations and effects of this embodiment are the same as of the first embodiment.

Figure 14:
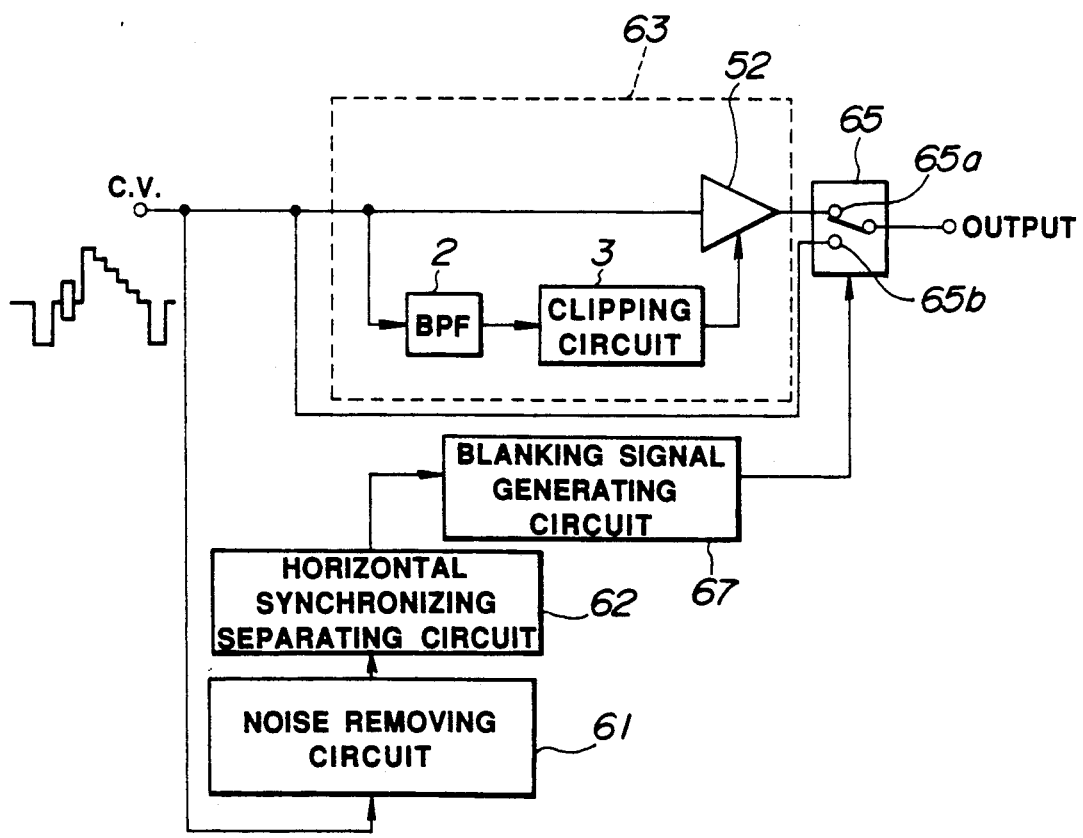

In FIGS. 14 and 15 is shown the sixth embodiment of the present invention.

The bright point reducing process is made on the video signal except the synchronizing signal in the fifth embodiment but on the video signal including the synchronizing signal in this embodiment.

The composite color video signal C.V. output from the CCU 13 shown in FIG. 12 is input into the bright point reducing apparatus shown in FIG. 14. In this bright point reducing apparatus, the above mentioned composite color video signal C.V. is input into the same bright point reducing circuit 63 as in the fifth embodiment, an analogue switch 65 at the input end 65b and a noise removing circuit 61. The output of the above mentioned bright point reducing circuit 63 is input into the above mentioned anologue switch 65 at the input end 65a. The analogue switch 65 is connected at the output end to a color monitor 15. The output of the above mentioned noise removing circuit 61 is input into a horizontal synchronizing separating circuit 62 and the output of this horizontal synchronizing separating circuit 62 is input into a blanking signal generating circuit 67. The above mentioned analogue switch 65 is controlled to be switched by the blanking signal generated by this blanking signal generating circuit 67.

Figure 15A:
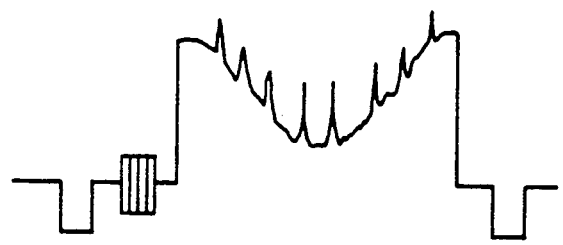
FIGS. 15(a) to (c) are waveform diagrams for explaining the operation of this embodiment.
Figure 15B:
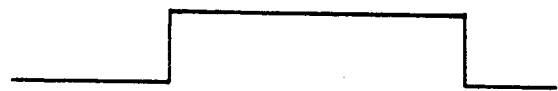
Figure 15C:

In this bright point reducing apparatus, a composite color video signal (VBS signal) C.V. including a synchronizing signal and burst signal as is shown in FIG. 15(a) is all processed by the bright point reducing circuit 63. On the other hand, the synchronizing separation is made from the above mentioned composite color video signal C.V. in the horizontal synchronizing separating circuit 62 and, on the basis of the output of this horizontal synchronizing separating circuit 62, a blanking signal as is shown in FIG. 15(b) is generated in the blanking signal generating circuit 67. This blanking signal is a signal which is of an H level in the video picturing part of the composite color video signal C.V. but is of an L level in the other part. In the analogue switch 65, when the above mentioned blanking signal is of an H level, the input end 65a will be selected but, when of an L level, the input end 65b will be selected. Therefore, as shown in FIG. 15(c), in the signal output from the analogue switch 65, the bright point reducing process is applied to the video picturing part but the other part than the video picturing part is replaced with the original signal shown in FIG. 15(a). Thereby, by the bright point reducing process by the bright point reducing circuit 63, the synchronizing signal and burst signal are prevented from deteriorating.

According to this embodiment, the same as in the fifth embodiment, the luminance of the bright point part is depressed, the amplitude of the color signal is also depressed, therefore the chroma saturation of the bright point part is depressed and the pseudo-color accompanying the bright point can be also reduced.

The other formations, operations and effects are the same as in the fifth embodiment.

The above mentioned first to fifth embodiments can be used not only for the endoscope apparatus but also for any other signal processing system.

As described above according to the first to fifth embodiments, there are effects that, without being influenced by a synchronizing signal or the like, the bright point part can be reduced and, without varying the γ characteristics of the points other than the bright point, in a state favorable in the gradation reproductivity, the inspected part can be expressed.

In FIGS. 16 to 19 is shown the seventh embodiment of the present invention.

In an endoscope pseudo-color reducing circuit 1 in this embodiment, a video signal is input into a low pass filter (LPF) 102, band pass filter (BPF) or high pass filter (HPF) 103 and color signal processing circuit 105. In the above mentioned LPF 102, a luminance signal is extracted from the video signal. In the above mentioned filter 103, a predetermined frequency band component is extracted from the video signal and thereby a signal component including a bright point signal component is extracted. The bright point signal component is extracted from the output of this filter 103 by extracting the component of a level above a predetermined value as by clipping a low noise component in a bright point detecting circuit 104. The color signal C output from the above mentioned color signal processing circuit 105 is output as a color signal C' having had the pseudo-color reduced through a gain controlling amplifier (which shall be abbreviated as a GCA hereinafter). The gain of the above mentioned GCA 106 is controlled by the output of the above mentioned bright point detecting circuit 104 so that the color signal of the bright point part may be depressed and the generation of the pseudo-color for the spike-like bright point may be reduced.

The frequency band extracted by the above mentioned filter 103 is set in response to the spatial size of the above mentioned bright point in order to extract only a bright point (bright part) of a spatial size below a predetermined value. The level to be extracted by the above mentioned bright point detecting circuit is set to extract only a bright point of a level difference from the periphery above a predetermined value.

This embodiment shall be explained in the following with reference to FIGS. 17 to 19.

Figure 17:
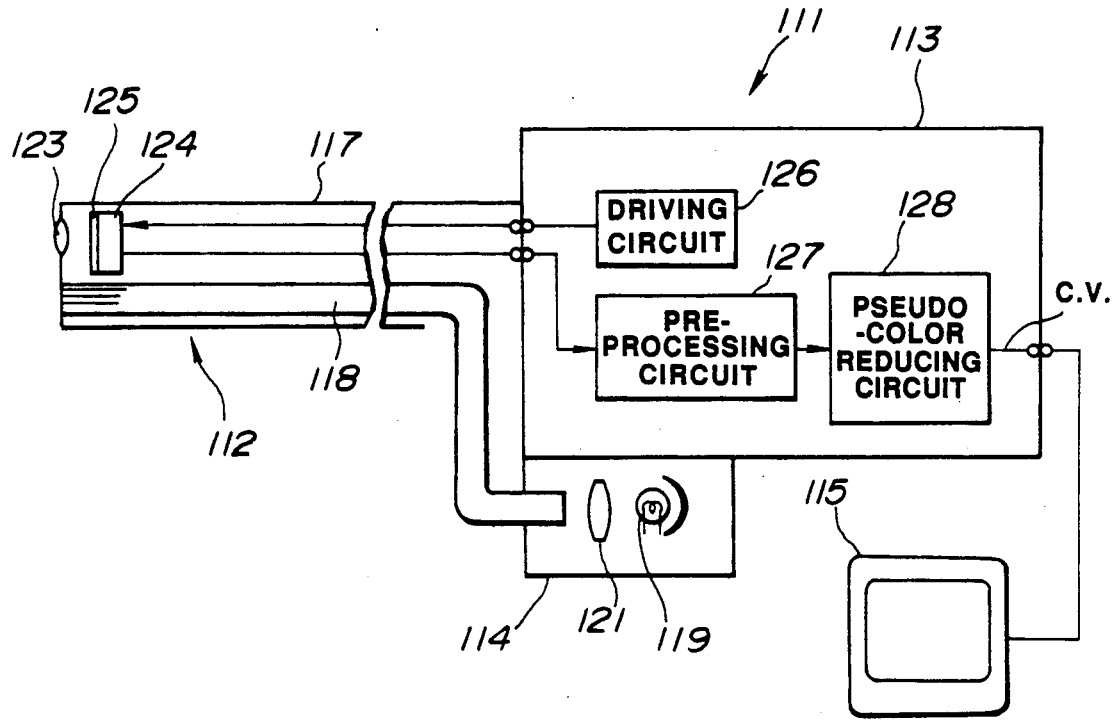

As shown in FIG. 17, an endoscope apparatus 111 provided with the seventh embodiment comprises an electronic endoscope (which shall be mentioned as a video scope hereinafter) 112, a signal processing apparatus (which shall be mentioned as a CCU hereinafter) 113 for processing the signal for this video scope 112, a light source unit 114 feeding an illuminating light to the above mentioned video scope 112 and a color monitor 115 displaying the image signal output from the CCU 113.

The above mentioned video scope 112 has an insertable part 117 elongated so as to be insertable into a body cavity or the like, a light guide 118 transmitting an illuminating light is inserted through this insertable part 117, is further inserted through a universal cord extended from the insertable part and is connectable to the light source 114. A light source lamp 119 is housed within this light source unit 114 and a white color light by this light source lamp 119 is condensed by a condenser lens 121 and is radiated to the light guide 118 on the entrance end surface.

The illuminating light fed to the above mentioned light guide 118 on the entrance end surface is transmitted to the exit end surface of the light guide 118 and is radiated toward an object to be imaged. The object illuminated by this illuminating light is made to form an image on the imaging surface of a CCD 124 as an imaging device arranged in the focal plane of an objective lens fitted to the tip part of the insertable part 117. A mosaic color filter 125 is fitted to this CCD 124 on the imaging surface and separates the respective pixels of the CCD 124 into colors, for example, of R, G and B. This optical image separated in the colors is photoelectrically converted by the CCD 124 and is accumulated as an electric charge. By the application of a driving signal from a driving circuit 126 within the CCU 113, a signal from the CCD 124 is read out, is input into a pre-processing circuit 127, has a reset noise removed and γ corrected in this pre-processing circuit 127 and is then input into a pseudo-color reducing circuit 128 of this embodiment. By this pseudo-color reducing circuit 128, the signal has the pseudo-color for the bright point depressed, has a synchronizing signal not illustrated superimposed, is converted to a composite color video signal C.V. of an NTSC and is color-displayed on the color monitor 15.

Figure 18:
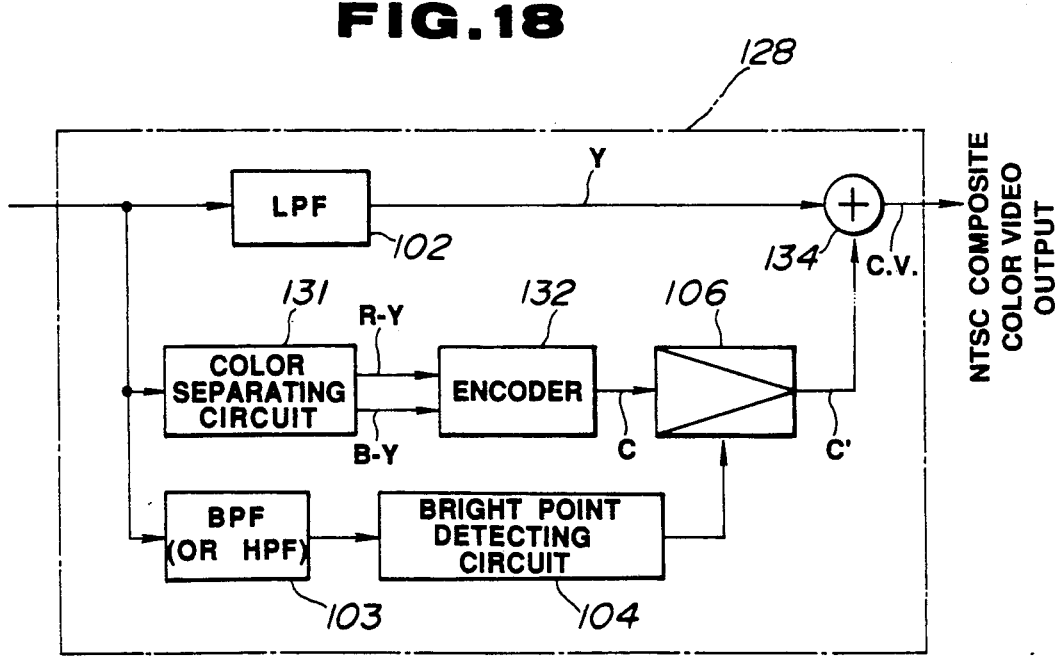

The formation of the above mentioned pseudo-color reducing circuit 128 is shown in FIG. 18.

The video signal from the CCD 124 input through the pre-processing circuit 127 has a luminance signal Y extracted by the LPF 102 and is also input into a color separating circuit 131. Color difference signals R-Y and B-Y are produced in this color separating circuit 131, are input into an NTSC encoder 132 and are encoder-processed by a color subcarrier to produce a chroma signal C. The above mentioned color separating circuit 131 and encoder 132 correspond to the color signal processing circuit 105 in FIG. 16.

The above mentioned video signal is input into the BPF (or HPF) 103, has the spike-like bright point signal part extracted and is input into the bright point detecting circuit 104 which is formed, for example, of a clipping circuit clipping and removing a low noise component or a subtracting circuit extracting the bright point side above a prescribed level. The output signal of this bright point detecting circuit 104 is applied to the gain controlling terminal of the GCA 106 so that, in the detected bright point signal period, the gain may be low for the chroma signal C output from the encoder 132 to depress the signal level of the bright point signal part in the chroma signal C. The chroma signal C' having had the signal level depressed in this bright point signal part is input into a mixing adder 134, is mixed with a luminance signal Y and is output from the output end as a composite color video signal C.V., for example, of an NTSC system.

Figure 19A:
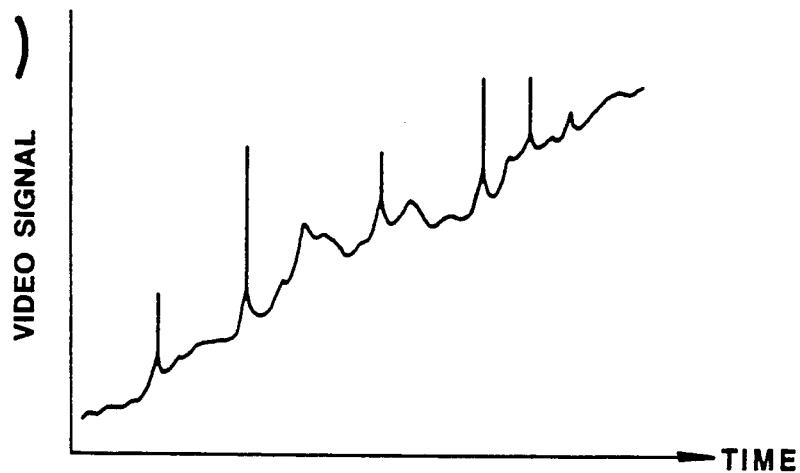
FIGS. 19(a) to (c) are waveform diagrams for explaining the operation of this embodiment.
Figure 19B:
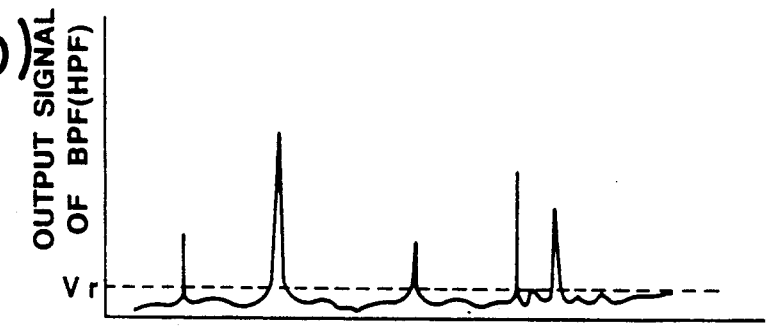
Figure 19C:
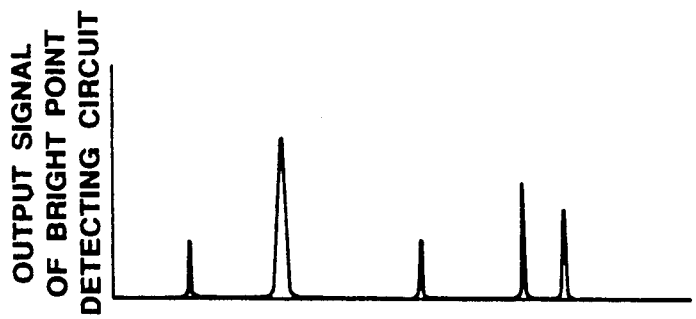

In this embodiment, in case a video signal including spike-like bright points as shown in FIG. 19(a) is input into the pseudo-color reducing circuit 128, a bright point signal component including spike-like bright points as shown in FIG. 19(b) will be extracted. By the bright point detecting circuit 104, the part below the level Vr, for example, in FIG. 19(b) is clipped and a bright point signal is extracted as shown in FIG. 19(c) and is applied to the gain controlling terminal of the GCA 106 in which the gain will become small when the level applied to the gain controlling terminal is large. Therefore, in the bright point signal period shown in FIG. 19(c), the chroma signal C input into the GCA 106 through the color separating circuit 131 and encoder 132 will be output as a chroma signal C' depressed in the gain more than in the other case than this bright point signal period. Therefore, the composite color video signal C.V. produced by being mixed by the adder 134 with the luminance signal Y extracted through the LPF 102 will be depressed in the chroma saturation in the bright point signal period and will be depressed in the pseudo-color for the spike-like bright points.

Figure 20:
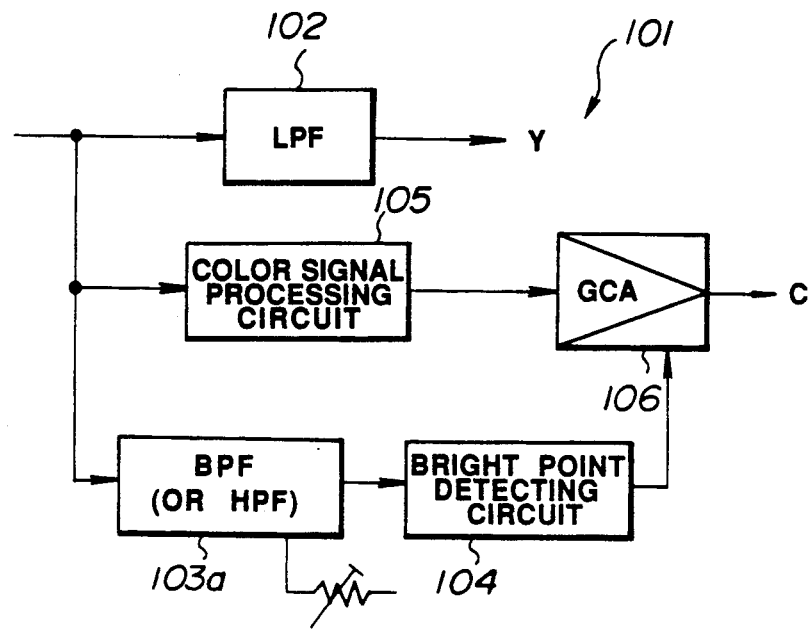
FIG. 20 is a block diagram showing the summary of the eighth embodiment of the present invention.

In FIG. 20 is shown the eighth embodiment of the present invention.

Figure 16:
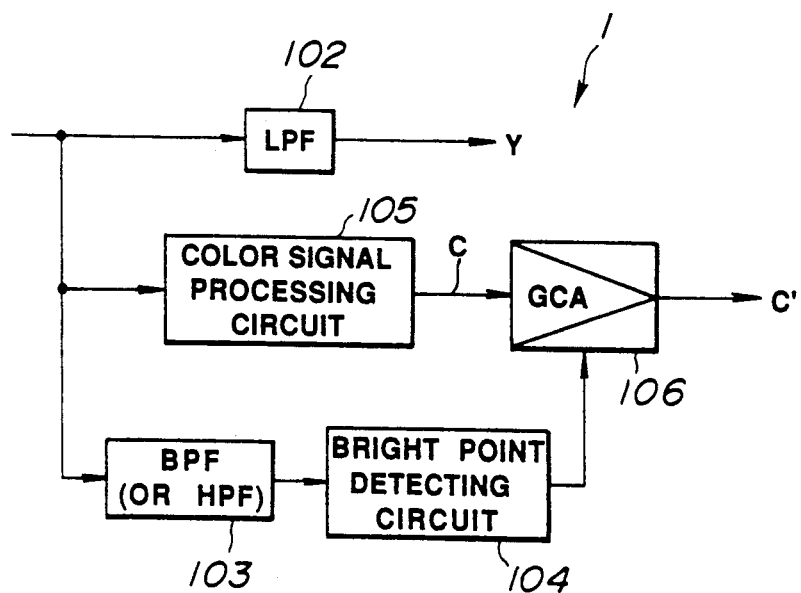

In this embodiment, a BPF (or HPF) 103a variable in the passed frequency band is used for the BPF (or HPF) 103 in FIG. 16.

The formation of the above mentioned BPF 103a is the same as the BPF 2a shown, for example, in FIG. 6. That is to say, as shown in FIG. 7, in response to the direct current voltage given to the control terminal 78, the resonance frequency fc in the characteristic curve of the BPF is variable and the passed frequency band is variable.

As the passed frequency band of the BPF 103a corresponds to the spatial size of the bright point, according to this embodiment, the width of the bright point to be reduced in the pseudo-color can be controlled.

The other formations, operations and effects are the same as in the seventh embodiment.

Figure 21:
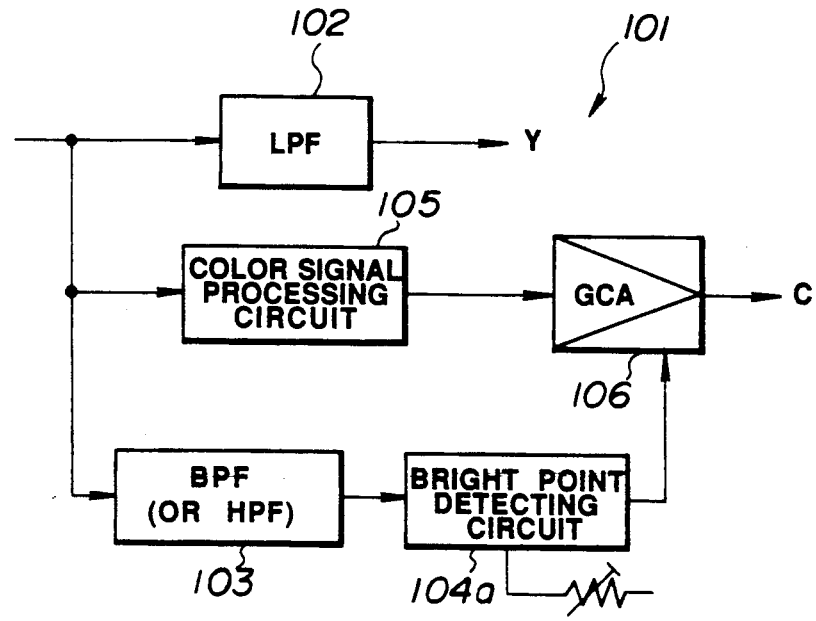
FIG. 21 is a block diagram showing the summary of the ninth embodiment of the present invention.

In FIG. 21 is shown the ninth embodiment of the present invention.

In this embodiment, a bright point detecting circuit 104a variable in the level and set to extract a component above a predetermined value is used for the bright point detecting circuit 104 in FIG. 16.

The formation of the above mentioned bright point detecting circuit 104a is the same as the circuit shown, for example, in FIG. 9. In this bright point detecting circuit 104a, a bright point signal component extracted by the BPF (or HPF) 103, shown in FIG. 19(b) and below a reference voltage Vr is clipped and only a bright point component of a level above the reference voltage Vr is extracted. The level of the reference voltage Vr to be a clipping level can be variably set from outside.

According to this embodiment, when extracting only the bright point of a level difference from the periphery above a predetermined value, the above mentioned predetermined value can be varied.

The other formations, operations and effects are the same as in the seventh embodiment.

Figure 22:
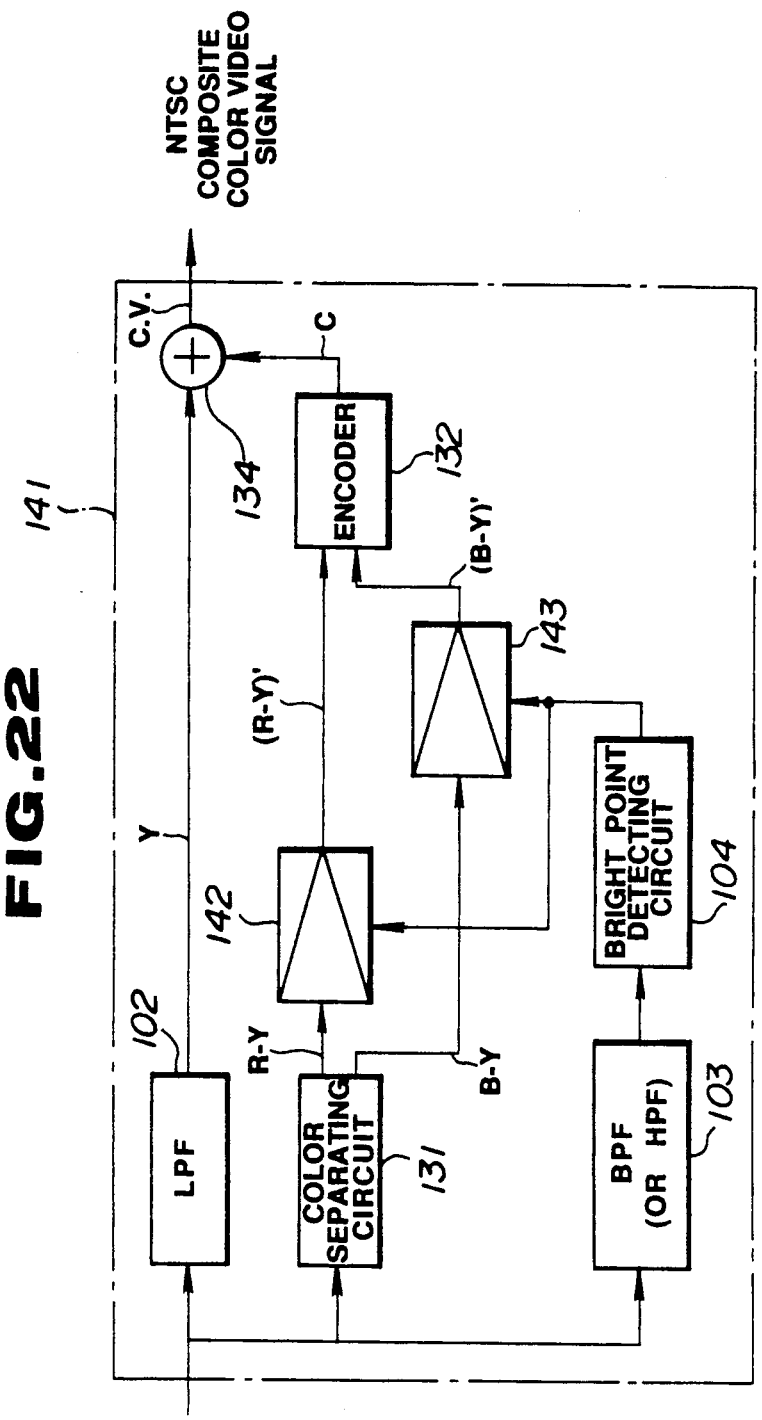
FIG. 22 is a block diagram showing a pseudo-color reducing circuit in the tenth embodiment of the present invention.

In FIG. 22 is shown the tenth embodiment of the present invention.

In a pseudo-color reducing circuit 141 of this embodiment, the color difference signals R-Y and B-Y output from the color separating circuit 131 in the seventh embodiment shown in FIG. 18 are input respectively into GCA's 142 and 143 and the output signal of the bright point detecting circuit 104 is applied to these GCA's 142 and 143 at the gain controlling terminals to depress the gain in the bright point signal period. Color difference signals (R-Y)' and (B-Y)' output respectively from these GCA's 142 and 143 and depressed in the signal level in the bright point signal period are input into an encoder 132 and are converted to a chroma signal C which is then mixed by a mixing adder 134 with a luminance signal Y passed through an LPF 102 and is output as a composite color video signal C.V.

In the above mentioned seventh embodiment, the chroma signal C passed through the encoder 132 is depressed in the signal level in the bright point signal period but, in this embodiment, the color difference signals R-Y and B-Y on the side of the step before being passed through the encoder 132 are depressed in the signal level in the bright point signal period and are then passed through the encoder 132 to produce a chroma signal C.

In this embodiment, there are the same effects as in the above mentioned seventh embodiment and, as the pseudo-color is depressed on the step side earlier than in the seventh embodiment, without being influenced by the frequency characteristics of the circuit elements interposed in the course, the pseudo-color by the luminance signal can be effectively removed or reduced.

The other formations, operations and effects are the same as in the seventh embodiment.

Figure 23:
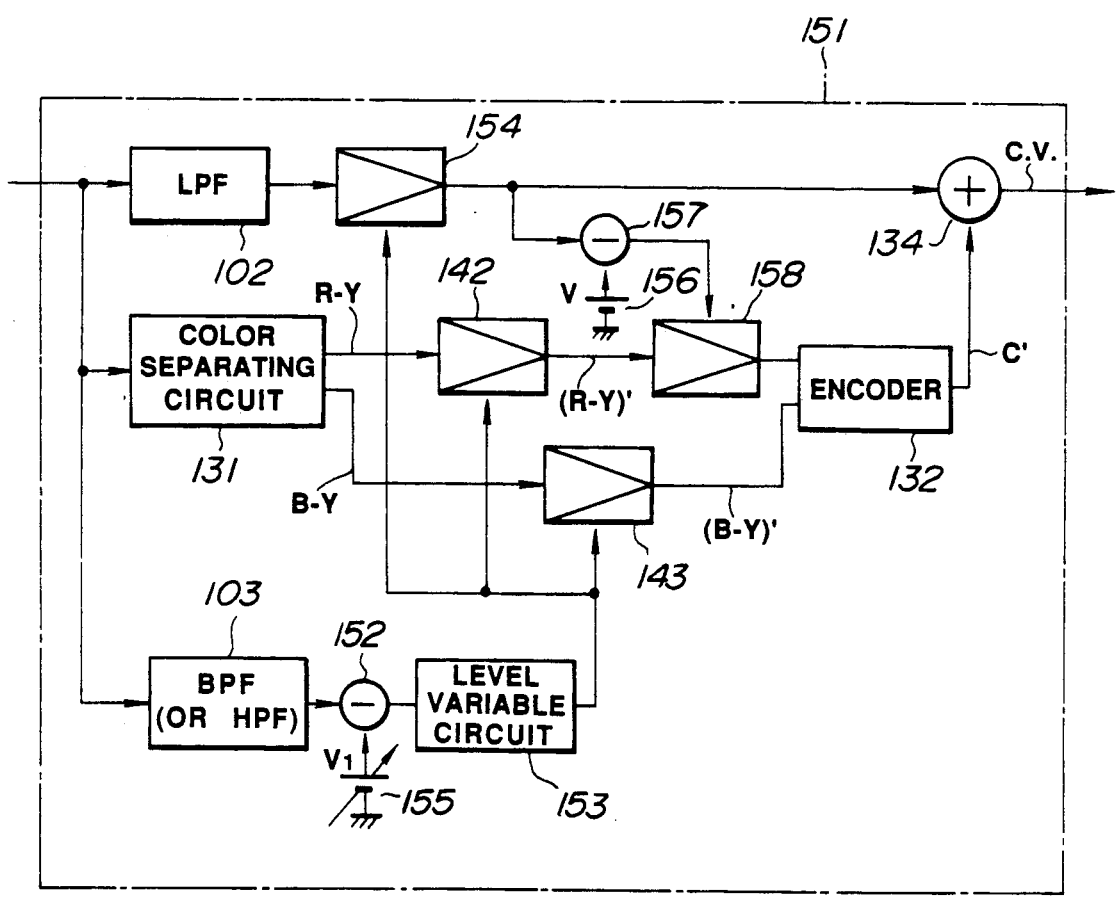
FIG. 23 is a block diagram showing a pseudo-color reducing circuit in the 11th embodiment of the present invention.
Figure 24A:
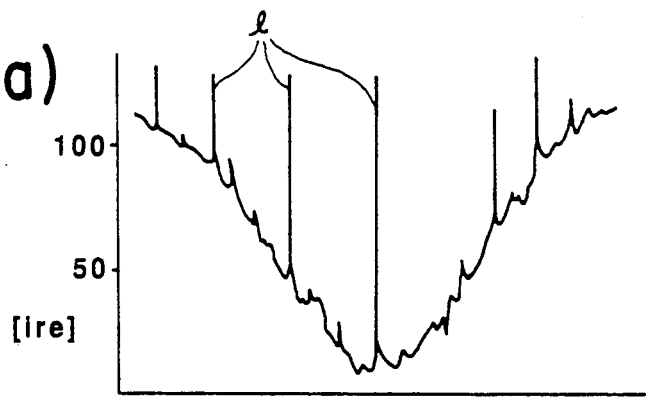
FIGS. 24(a) and (b) are waveform diagrams for explaining the bright point operation in the related art example.
Figure 24B:
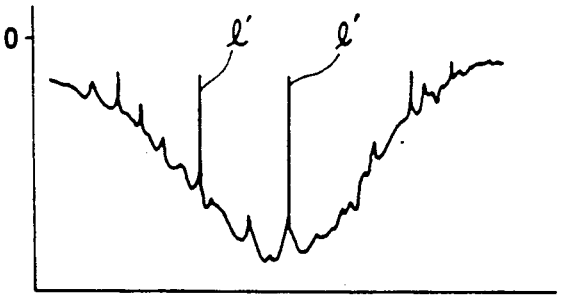

In FIG. 23 is shown the 11th embodiment of the present invention.

In a pseudo-color reducing circuit 151 of this embodiment, the bright point detecting circuit 104 in the tenth embodiment shown in FIG. 22 is formed of a subtractor 152, the output of this subtractor 152 is applied to GCA's 142 and 143 at the gain controlling terminals through a level variable circuit 153 and is applied also to the gain controlling terminal of a GCA 154 into which a luminance signal Y passed through an LPF 102 is input. That is to say, in the period when the bright point signal is input, both color difference signals R-Y and B-Y will be depressed and the luminance signal Y will be also depressed in the level so as to be prevented from being displayed at a high luminance. Also, in this embodiment, in the subtractor 152, a voltage V1 by a variable voltage source 155 is subtracted from the bright point component extracted through a BPF (or HPF) 103 and only the bright point signal is extracted. In such a case, the voltage V1 may be manually set so that the observer may effectively remove only the bright point in response to the environment or the like. Also, by the level variable circuit 153, the level of the bright point signal can be variably set and an adjustment adapted to the gain control voltage versus gain characteristics by the GCA's 142, 143 and 154 can be made.

There is provided a correcting means wherein the luminance signal Y from a level the voltage V of the voltage source 156 has been subtracted by the subtractor 157 is applied to the gain controlling terminal of a GCA 158 into which at least one (R-Y in this case) of the color difference signals R-Y and B-Y is input and the gain is decreased or increased for the signal above this voltage V so that the pseudo-color by the difference of the color saturation degree of the color filter may be depressed, that is to say, no pseudo-color may appear.

The outputs of the above mentioned GCA's 158 and 143 are input into an encoder 132 and are converted to a chroma signal C' which is then mixed by a mixing adder 134 with the luminance signal Y passed through the GCA 154 and is output as a composite color video signal C.V.

The other formations, operations and effects are the same as in the tenth embodiment.

The present invention can be applied not only to outputting as a composite color video signal but also to outputting as three primary color signals of R, G and B. For example, the luminance signal Y and color difference signals R-Y and B-Y may be output as three primary color signals through an inverse matrix circuit.

As described above, according to the seventh to 11th embodiments, as a bright point signal component is extracted and a color signal forming a video signal is depressed in response to this extracted signal component, the production of a pseudo-color by a spike-like bright point part can be reduced.

It is apparent that, in this invention, a wide range of different working modes can be formed based on this invention without deviating from the spirit and scope of the invention. This invention is not restricted by its specific working modes except being limited by the appended claims.

What is claimed is:

1. A method of reducing influence of a bright part of an image in an endoscope image signal comprising respective steps of:
   extracting, from said endoscope image singal, a signal component of said bright part of said image in which a difference in brightness level at a periphery of said image is above a predetermined value and a spatial size of said bright part is below a predetermined value; and
   depressing said bright part of said image in said endoscope image signal or a signal based on said endoscope image signal by using said signal component of said bright part of said image.

2. A method according to claim 1 wherein said depressing step is to depress said bright part of said image in response to the brightness level of said signal component of said bright part.

3. A method according to claim 2 wherein said depressing step includes subtracting said signal component of said bright part of said image from said image signal.

4. A method according to claim 2 wherein said depressing step includes reducing said endoscope image signal or a signal based on said endoscope image signal in response to said signal component of said bright part of said image.

5. A method according to claim 1 wherein said depressing step is to depress said bright part of said image in said endoscope image signal.

6. A method according to claim 1 wherein said depressing step is to depress said bright part of said image of a color signal based on said endoscope image signal in order to reduce a pseudo-color influenced by said bright part.

7. A method according to claim 6 wherein said depressing step is to reduce chroma saturation of said color signal.

8. A method according to claim 1 wherein said extracting step includes respective steps of extracting a predetermined frequency band component in said endoscope image signal and extracting a component of a brightness level above a predetermined value in said frequency band component.

9. A method according to claim 8 wherein said step of extracting a predetermined frequency band component can vary the extracted frequency band component.

10. A method according to claim 8 wherein said step of extracting a predetermined frequency band component can selectively extract a plurality of frequency band components.

11. A method according to claim 8 wherein said step of extracting a component of said brightness level above a predetermined value can vary said brightness level.

12. A method according to claim 8 wherein said step of extracting a component of said brightness level above a predetermined value can selectively set a plurality of brightness levels.

13. A method according to claim 1 wherein said extracting step is to process an image signal including no synchronizing signal.

14. A method according to claim 1 wherein said extracting step is to process an image signal including a synchronizing signal.

15. A circuit for reducing influence of a bright area in an endoscope image signal comprising:
   an extracting means for extracting, from an endoscope image signal, a signal component of a bright area in which a difference in brightness level at a periphery of said bright area is above a predetermined value and a spatial size of said bright area is below a predetermined value; and
   a depressing means for depressing said bright area in said endoscope image signal or a signal based on said endoscope image signal by using said signal component of said bright area extracted by said extracting means.

16. A circuit according to claim 15 wherein said depressing means is to depress said bright area in response to the brightness level of said signal component of said bright area.

17. A circuit according to claim 15 wherein said depressing means includes a means of subtracting the signal component of said bright area from said endoscope image signal.

18. A circuit according to claim 16 wherein said depressing means includes a gain controlling amplifier reducing said endoscope image signal or a signal based on said endoscope image signal in response to said signal component of said bright area.

19. A circuit according to claim 15 wherein said depressing means is to depress said bright area in said endoscope image signal.

20. A circuit according to claim 15 wherein said depressing means is to depress said bright area of a color signal based on said endoscope image signal in order to reduce a pseudo-color influenced by said bright area.

21. A circuit according to claim 20 wherein said depressing means is to reduce chroma saturation of said color signal.

22. A circuit according to claim 15 wherein said extracting means includes a filtering means for extracting a predetermined frequency band component in said endoscope image signal and a means for extracting a component of said brightness level above a predetermined value in said frequency band component extracted by said filtering means.

23. A circuit according to claim 22 wherein said filtering means includes a filter variable in an extracted frequency band component.

24. A circuit according to claim 22 wherein said filtering means includes a plurality of filters respectively extracting different frequency band components and a selecting means for selecting one of said filters.

25. A circuit according to claim 22 wherein said means for extracting the component of the brightness level above the predetermined value can vary said brightness level.

26. A circuit according to claim 25 wherein said means for extracting the component of the brightness level above the predetermined value includes a clipping circuit variable in clipping level.

27. A circuit according to claim 25 wherein said means for extracting the component of the brightness level above the predetermined value includes a plurality of clipping circuits respectively different in clipping level and a selecting means for selecting one of said clipping circuits.

28. A circuit according to claim 25 wherein said means for extracting the component of the brightness level above the predetermined value includes a subtractor subtracting a variable predetermined value from said frequency band component extracted by said filtering means.

29. A circuit according to claim 15 wherein said extracting means is to input an image signal including no synchronizing signal.

30. A circuit according to claim 15 wherein said extracting means is to input an image signal including a synchronizing signal.

31. An endoscope apparatus comprising:
an endoscope body having an elongate insertable part including an observing window at a tip and an image forming optical system receiving light coming from an object to be imaged and incident through said observing window and forming an endoscope image;
an imaging means for imaging said endoscope image formed by said image forming optical system;
an extracting means for extracting a signal component of a bright image area in which a difference in brightness level at a periphery of said bright image area is about a predetermined value and a spatial size of said bright image area is below a predetermined value from the endoscope image signal obtained by said imaging means; and
a depressing means for depressing said bright image area in said endoscope image signal based on said endoscope image signal by using said signal component of said bright image area extracted by said extracting means.

32. An endoscope apparatus according to claim 31 wherein said imaging means includes an imaging device arranged in an image forming position of said image forming optical system.

33. An endoscope apparatus according to claim 31 wherein said endoscope body further has an eyepiece part provided on a rear end side of said insertable part and an image transmitting means for transmitting the endoscope image formed by said image forming optical system and said imaging means is a television camera removably connected to said eyepiece part.

* * * * *